(12) United States Patent
Vierich et al.

(10) Patent No.: US 9,075,859 B2
(45) Date of Patent: Jul. 7, 2015

(54) PARAMETERIZED DATABASE DRILL-THROUGH

(75) Inventors: Ralf Vierich, Ontario (CA); Kevin Ferguson, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 10/624,490

(22) Filed: Jul. 23, 2003

(65) Prior Publication Data

US 2004/0139102 A1 Jul. 15, 2004

(30) Foreign Application Priority Data

Jul. 23, 2002 (CA) ...................................... 2394514

(51) Int. Cl.
*G06F 17/30* (2006.01)
*G06F 7/00* (2006.01)

(52) U.S. Cl.
CPC .... G06F 17/30592 (2013.01); G06F 17/30395 (2013.01)

(58) Field of Classification Search
CPC .................... G06F 17/30389; G06F 17/30592; G06F 17/30997
USPC ....................................................... 707/1–10
See application file for complete search history.

(56) References Cited

U.S. PATENT DOCUMENTS

| | | | | |
|---|---|---|---|---|
| 5,682,526 A | * | 10/1997 | Smokoff et al. | ........... 707/104.1 |
| 6,801,910 B1 | * | 10/2004 | Bedell et al. | ........................... 1/1 |
| 2002/0087516 A1 | | 7/2002 | Cras et al. | |
| 2004/0034615 A1 | * | 2/2004 | Thomson et al. | .................. 707/1 |

FOREIGN PATENT DOCUMENTS

| | | |
|---|---|---|
| EP | 1 081 610 A2 | 3/2001 |
| WO | WO 01/55937 A2 | 8/2001 |

OTHER PUBLICATIONS

Neil Thomson et al, Universal Drill-Down System for Coordinated Presentation of Items in Different Databases, Dec. 17, 2001.*
European Search Report issued by the European Patent Office on Feb. 28, 2006, in Application No. 03016834.8-2201.
"Powerplay Enterprise Server Guide," Cognos Inc., Apr. 24, 2002, pp. 57-62, available at http://apsdwh.vlaanderen.be/cognos/help/pes.pdf>.
"Cognos Web page," Jul. 21, 2002, p. 1-1, available at http://web.archive.org/web/20020721073248/http://cognos.com>.
"Schneider Logistics uses Cognos global Extranet to turn Information into Competitive Advantage," May 23, 2002, pp. 1-3, available at http://web.archive.org/web/20020814211035/www.cognos.com/news/releases/2002/0523.html>.

(Continued)

*Primary Examiner* — Sangwoo Ahn
(74) *Attorney, Agent, or Firm* — Shumaker & Sieffert, P.A.

(57) ABSTRACT

A database interface for generating drill-through pats for various data cubes, derived from different report generating applications is disclosed. The interface comprises: (a) means for accepting a request from a user for data; (b) means for translating the request into a drill-through path selected from a plurality of possible drill-through paths between a source and a target; (c) means for applying one or more parameters to the selected drill-rough path to produce a valid drill-through path and to transfer the requested data over the valid drill-through path to an application; and (d) display means for displaying the requested data to the user.

17 Claims, 6 Drawing Sheets

(56) References Cited

OTHER PUBLICATIONS

"The Role of an OLP Server in a Data Warehousing Solution," Hyperion Solutions Corp., DM Review, Powell Publications, West Allis, WI, US, Nov. 30, 1999, pp. 1-18.

Cui, Yingwei et al., "Practical Lineage Tracing in Data Warehouses," Data Engineering 2000 Proceedings, 16th International Conference, San Diego, CA, Feb. 29, 2000 thru Mar. 3, 2000, Los Alamitos, CA, IEEE Comput. Soc., pp. 367-378.

Popa, Lucian et al., "Mapping XML and Relational Schemas with Clio," Proceedings of the 18th International Conference on Data Engineering, San Jose, CA, Feb. 26, 2002-Mar. 1, 2002, International Conference on Data Engineering (ICDE) Los Alamitos, CA, IEEE Comp. Soc., vol. conf. 18, Feb. 26, 2002, pp. 498-499.

"Oracle Warehouse Builder: A Technical Overview," Oracle Technical White Paper, Feb. 2000, pp. 1-21.

Rahm, Erhard et al., "A survey of approaches to automatic schema matching," VLDB Journal, Springer Verlage, Berlin, Germany, vol. 10, Nov. 21, 2001, pp. 334-350.

Wiederhold, Gio et al., "The Conceptual Basis for Mediation Services," IEEE Expert, IEEE Inc., New York, New York, vol. 12, No. 5, Sep. 1, 1997, pp. 38-47.

Jadav, Divyesh et al., "Caching of large Database Objects in Web Servers," Research Issues in Data Engineering, 1997 Proceedings, 7th International Workshop in Birmingham, United Kingdom, Apr. 7-8, 1997 and Los Alamitos, CA, IEEE Comput. Soc., Apr. 7, 1997 pp. 10-19.

Examination Report from corresponding European Application Serial No. 03 016 835.5-2201 dated Apr. 14, 2009 (8 pages).

Cui et al: "Lineage Tracing in a Data Warehousing System" Data Engineering 2000. Proceedings. 16th International Conference in San Diego, CA, USA Feb. 29-Mar. 3, 2000, IEEE Comput. Soc, US, Feb. 29, 2000, pp. 683-684 XP010378773.

* cited by examiner

PARAMETERIZED DATABASE DRILL-THROUGH

FIELD OF THE INVENTION

The present invention relates to interactively searching a database in such a manner that it is quick and easy to search, drill down, drill-up and drill across a data collection, presenting the user with summary information using multiple independent hierarchical category taxonomnies of the data collection. The present invention also relates to retrieving information from a database based on content aggregation, management and distribution.

BACKGROUND OF THE INVENTION

The field of business applications of computer technology has seen many important changes over the last few years. With steadily growing computational power and data storage capacities of computer systems used for business data processing, the interest of the business community has shifted from transactional data management systems known as on-line transaction processing (OLTP) systems, mostly supporting day-to-day business operations, and from relatively simple business data processing systems, towards sophisticated business management systems, such as online analytical processing (OLAP) and business intelligence (BI) systems, integrating at the enterprise level many facets and functions of the business, including planning, manufacturing, sales and marketing. Collectively, these are often termed decision support systems.

Among various alternative approaches to business data management and analysis developed over the last few years, many are related to data warehousing. A data warehouse can be defined broadly as a subject-oriented collection of business data identified with a particular period of time, as opposed to a transactional database which is dedicated to ongoing business activities. Data in a warehouse is normally gathered from a variety of sources (mostly various OLTP and legacy systems) and merged into a coherent whole. Data in a warehouse is usually stable, with data being added to the warehouse periodically but usually not removed. However, in some cases the oldest data may be unloaded when the newer data is added.

As opposed to data stored in OLTP systems intended to support day-to-day operations and optimized for the speed and reliability of transaction updating, data stored in a data warehouse is intended to provide higher-level, aggregated views of the data in support of business decision making. This might include total sales by product line or region over a selectable period of time. To provide consistently fast responses to such aggregating queries, data in a data warehouse must be structured in a manner facilitating its synthesis, analysis, and consolidation.

The most characteristic feature of warehoused business data is its multidimensional view of a business - so-called because the business data is organized according to major aspects and measures of the business called dimensions. The dimensions for a business may include its products, markets, profits, or time periods involved. This is in contrast to a data dependencies model of the business data used to keep track of all logical relationships among all the possible data elements relevant to the business and its day-to-day operations.

A dimension may include several hierarchical levels of categories. For example, the market dimension may contain, in descending order, such categories as country, region, state, and city, each category having its own number of specific instances. A hierarchical dimension reduces the total number of dimensions necessary to describe and organize the data, as compared with the situation where each category is represented by a separate dimension.

The action of viewing data in greater detail by moving down the hierarchy of categories, i.e., by moving from parent to child category, is sometimes referred to as "drilling down" through the dam Quite naturally, the action of moving in the opposite direction, i.e., up the hierarchy of categories, to produce a more consolidated, higher-level view of data, is known as "drilling up" through the data. Another aspect of this 'drilling' is the ability to 'drill through' from one form of data to another where the data are collected in reports having different meta-data models and/or data sources, but where the actual data are compatible (or able to be convened to a compatible form) for use in an application. Drill-through is sometimes defined as the action of navigating from one report to another report and applying the context of the source to the target. Drilling is further discussed below.

The vast amounts of warehoused or otherwise collected business data would be useless without software tools for its analysis. Such tools are known under the collective name of business intelligence (BI) applications, an example of which is a suite of BI applications from Cognos Inc. (Canada). BI applications provide, among other features, data warehouse construction tools, as well as database querying, navigation and exploration tools, and also include reporting, modeling, and visualization tools. Some of these tools combine techniques of data analysis and presentation will) methods for discovering hidden patterns and previously unrecognized relationships among data, an approach sometimes known as data mining.

Among BI applications previously made available to the business community, tools for visualizing business data are of particular importance. By interacting with the user graphically or pictorially, these tools have become the means of choice for consolidating and presenting vast amounts of complex information, in a manner which facilitates pattern recognition in the presented data and invites data exploration.

For example when invoking a drill-though operation from a row of the source report to a target report, a filter is constructed based on the source report row and the filter is then applied to the target report. This filter is then used by an application in requesting data from another application.

Using earlier technology it is necessary to apply some very strict rules in order to effectively drill from one application to another. The drill-through filter generated from the drill-through source is required to match up with the column names used in the target report. This column name matching is typically done through a set of intermediate files called query definitions (QD). A QD file is essentially the SQL query that can be used by a transformation program to generate a new data cube. The QD file contains the column name mapping used to generate the context filter that the target application can understand. In general, a context filter helps restrict the target report data based on the context (or some content) from the source report, For example, a context filter might specify "color=red" because that was the value contained in a cell selected in the source report. Then the target report will only show the sales data for appliances that are red. The process is duplicated for each source/target application pair, although in each case the intermediate files may have slightly different formats, but they still served as a column name map.

For convenience, the following definitions are given for terms that are used throughout this application:

Business Intelligence Tools: Software that enables business users to see and use large amounts of complex data. The following three types of tools are referred to as Business Intelligence Tools: Multidimensional Analysis Software—also known as Online Analytical Processing (OLAP)—Software that gives the user the opportunity to look at the data from a variety of different dimensions. Query Tools—Software that allows the user to ask questions about patterns or details in the data. Data Mining Tools—Software that automatically (and sometimes interactively) searches for significant patterns or correlations in the data.

Cube (also known as Multidimensional Cube): The fundamental structure for data in a multidimensional (OLAP) system. A cube contains dimensions, hierarchies, levels, and measures. Each individual point in a cube is referred to as a cell.

Data-Based Knowledge: Knowledge derived from data through the use of Business Intelligence Tools and the process of Data Warehousing that give us a new kind of knowledge based on data. Data-based knowledge can have several advantages compared to experience/intuition-based knowledge: Improved accuracy—because it is based on so many detailed facts. More current—because the data warehousing and business intelligence tools can so quickly analyze new data. More comprehensive—because so many different perspectives are available through the rapid recombination of elements from different dimensions and different levels of the data hierarchy. New insights are possible—because there are complex patterns in the data tat can be discovered by data mining that would never be detected by human analysis. Less subjective—because conclusions are tied directly to the physical data.

Dimension: One of the perspectives that can be used to analyze the data in an OLAP cube. When browsing the data in a cube, it is possible to view the data from the perspective of different combinations of dimensions. For a Sales database, the dimensions might include Product_Name, Time_of_Sale, Store_Name, and Promotion_Name. Dimensions contain one or more hierarchies, which have levels for drilling up and drilling down in the cube. When a dimension has just one hierarchy, which is quite common, people often refer to the dimension itself as having levels.

Hierarchy: Organization of data into a logical tree structure. Dimensions can have one or more hierarchies. A Time dimension, for example, might have a Calendar hierarchy and a Fiscal hierarchy. Hierarchies contain levels, which organize data in a logical structure. It is the combination of multidimensional data with a hierarchical view given by Business Intelligence Software that allows users to grapple successfully with large amounts of data If each member in a level has 5 to 10 children that are members at the next lower level, the user has a better chance of understanding the significance of the data. Moving between the levels of a hierarchy is called drilling up and drilling down.

Level; The hierarchies in dimensions have levels which can be used to view data at various levels of detail. A Time dimension might have levels for Year, Quarter, Month, and Day. A Product dimension might have levels for Product Family, Product Category, Product Sub-category, and Product Name. A Customer Geography dimension might have levels for Region, Country, District, State, City, and Neighborhood.

Member: One of the data points for a level of a hierarchy of a dimension. Some of the members of the Month level of the Time dimension are January, February, March, and April.

Measure; A numeric value stored in a fact table and in an OLAP cube. Sales Count, Sales Price, Cost, Discount, and Profit could all be measures in an OLAP cube.

Multidimensional Analysis—also known as On-Line Analytical Processing (OLAP): A process of analysis that involves organizing and summarizing data in a multiple number of dimensions. People can comprehend a far greater amount of information if that information is organized into dimensions and into hierarchies. The wide use of spreadsheets and graphs illustrates the need for people to have their information organized. A spreadsheet is a two-dimensional analysis tool. If a person could comprehend ten individual facts, they might possibly comprehend 100 facts if they were ranged in a spreadsheet. Simplistically, if three or four or five dimensions were displayed, the amount of information that could be comprehended might increase exponentially—to 1000 facts, 10,000 facts, and 100,000 facts respectively. Multidimensional data is also organized hierarchically, allowing users to "drill down" for more detailed information, "drill up" to see a broader, more summarized view, and "slice and dice" to dynamically change the combinations of dimensions that are being viewed.

SUMMARY OF THE INVENTION

The present invention is designed to overcome at least some of the problems found in earlier systems, and also provide other advantages as will be clear from The following description.

In the invention, a drill-through path is defined by a collection of parameter mappings that map context elements from the drill-through source (report) to the inputs of the target. In addition to defining the target/source mapping, these parameter mappings also determine any translation filtering, or formatting that may be required.

A parameter is a way of providing 'public' access to a column for external applications by giving it a name. More generally parameters define an input or output to a drill-through source or target. Additional parameters may be used to select and define conversion functions for the parameter mappings in the drill-through process so that the invention also acts as a means for defining a data converter or filter.

According to one aspect of the present invention, there is provided a database interface for generating drill-throughs of various data cubes, derived from different report generating applications. The interface comprises: (a) means for accepting a request from a user for data; (b) means for translating the request into a drill-through selected from a plurality of possible drill-through paths between a source and a target; (c) means for applying one or more parameters to the selected drill-through path to produce a valid drill-through path and to transfer the requested data over the valid drill-through path to an application; and (d) display means for displaying the requested data to the user, According to anther aspect of The present invention, there is provided a computer-based method for obtaining data from one or more compatible data sources for use within applications implementing a decision support system, the method comprising the steps of, in a business modeling tool before using a business intelligence application, (a) modeling a mapping of data between a source and a target to produce one or more possible drill-through paths between the source and the target, each drill-through path having one or more parameter mappings, in a business intelligence application using a report authoring tool, (b) accepting a request from a user for data, (c) translating the request into a drill-through path selected from the possible drill-through paths between the source and the target, (d) applying one or more parameters to the selected drill-through path to produce a valid parameter mapping and transferring the requested data over the valid parameter mapping to an application, and (e) displaying the requested data to a user.

According to mother aspect of the present invention, there is provided a computer-based system for obtaining data from one or more compatible data sources for use with applications implementing a decision support system, the system comprising, in a business modeling tool, before using a business intelligence application, (a) means for modeling a mapping of data between a source and a target to produce one or more possible drill-through paths between the source and the target, each drill-through path having one or more parameter mappings, and in a business intelligence application, using a report authoring tool, (b) means for accepting a request from a user for data (c) means for translating the request into a drill-through path selected from the possible drill-through paths between the source and the target, (d) means for applying one or more parameters to the selected drill-though path to produce a valid parameter mapping and to transfer the requested data over the valid parameter mapping to the application, and (e) display means for displaying the requested data to a user.

According to another aspect of the present invention, there is provided an apparatus for obtaining data from one or more compatible data sources for use within applications implementing a decision support system, the apparatus comprising, in a business modeling tool, (a) means for modeling a mapping of data between a source and a target to produce one or more possible drill-through path between the source and the target, each drill-through path having one or more parameter mappings, and in a business intelligence application, using a report authoring tool, (b) means for accepting a request from a user for data, (c) means for translating the request into a drill-through path selected from the one or more possible drill-through paths between the source and the target, (d) means for applying one or more parameters to the selected drill-through path to produce a valid parameter mapping and to transfer the requested data over the valid parameter mapping to the application, and (e) display means for displaying the requested data to the user.

A further understanding of other features, aspects and advantages of the present invention will be realized by reference to the following description, appended claims ad accompanying drawings.

BRIEF DESCRIPTION OF THE DRAWINGS

A preferred embodiment(s) of the invention will now be described with reference to dee following figures.

DETAILED DESCRIPTION OF THE PREFERRED EMBODIMENT(S)

Figure 1:
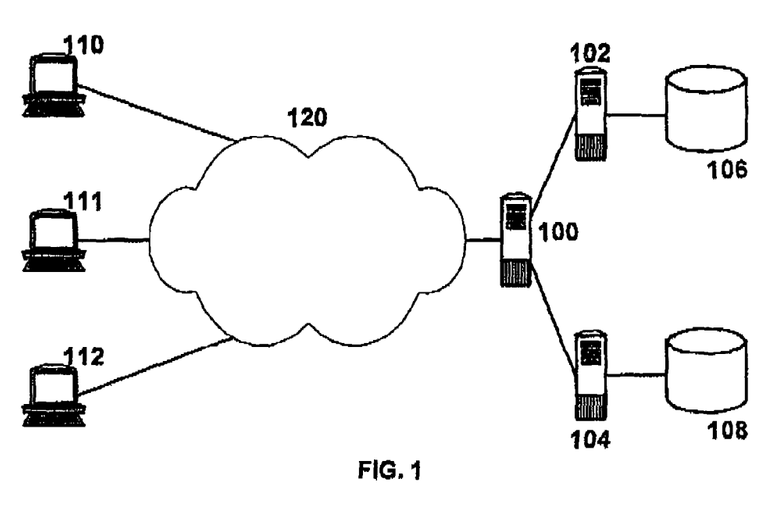
FIG. 1 shows the computer and related systems and connections within which the invention may be practiced.

Typically, embodiments of the invention are practiced within a network of computers and related equipment as illustrated in FIG. 1. Data is stored in a data warehouse comprising files servers 100, 102, 104 and storage devices 106, 108, with their related software applications (not shown), accessed from workstations 110, 111, 112 over a network 120, the workstations also including related software applications (not shown).

Figure 2:
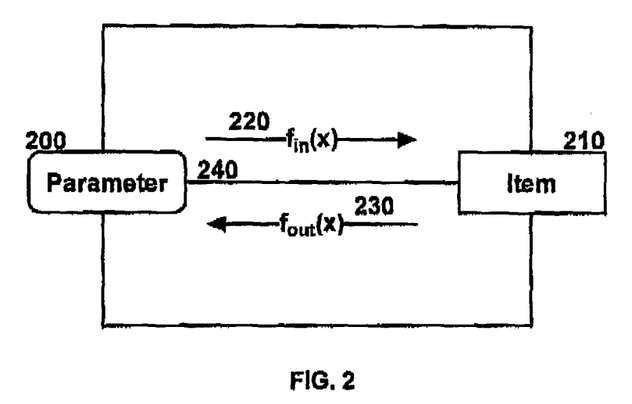
FIG. 2 shows a simple situation in which a single parameter mapping defines a single item.

Turning now to the FIG. 2, a first preferred embodiment is shown in which an item 210, representing a report column, or parameter, or some other expression from a drill-through source or target, has a parameter 200 exposed. The parameter mapping 240 from the item includes two optional mapping functions 220, 230 which may translate the data from the outside world (using the parameter 200) to the item and vice-versa.

Figure 3:
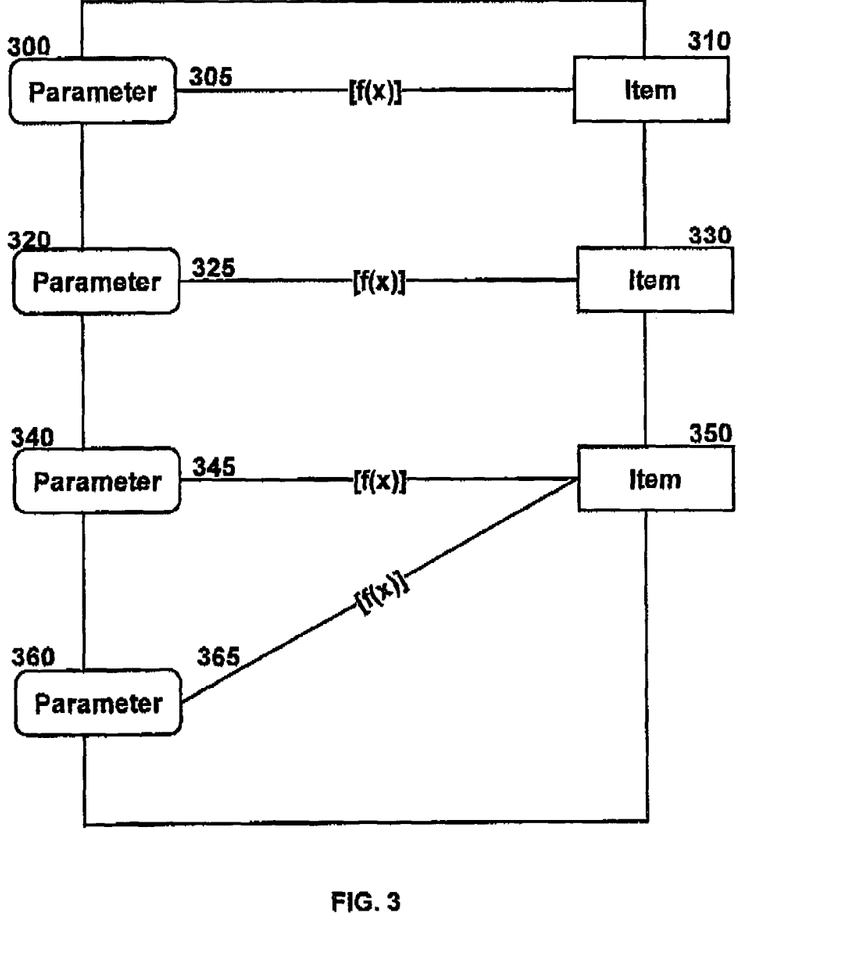
FIG. 3 shows a more complex example, in which there are several items, each defined by one or more parameter mappings.

Several optional functions made feasible by other preferred embodiments are describe below. One function already mentioned is the ability to translate or convert the data during the drill-through operation, and to select the actual conversion by means of a parameter. Earlier applications not incorporating embodiments of the present invention were only able to perform data conversion or manipulation of drill-through parameters within the report-producing application, and the required functions were stored with the report schema. This meant that the report was often used specifically for one drill-through since the report column used in the context filter would only make sense for that particular drill-through. By enhancing the drill-through service so the input and output conversion functions are part of the drill-through model, it is possible to decouple them from the report itself (or its description and schema). In other words, any data conversions required for a drill-through path are encapsulated in the drill-through service, rather than in the report (and its schema). This is illustrated in the FIG. 3, in which a drill-through source or target is generalized to a collection of parameters 300, 320, 340, 360 as shown each related (or mapped) over a parameter mapping including a function 305, 325, 345, 365 respectively to one of the items 310, 330, 350. Note that more than one parameter can map to a single drill-through item as is shown in FIG. 3, where parameter 340 and parameter 360 both map to item 350 through their respective functions in parameter mappings 345, 365.

Another feature made possible by embodiments of the present invention is a drill-through path. A drill-through path is a collection of source and target parameter mappings. The drill-through path effectively couples the source and target objects together. A single drill-through target can have many drill-through sources and vice-versa. This aspect is illustrated in FIG. 3, described earlier.

Figure 4:
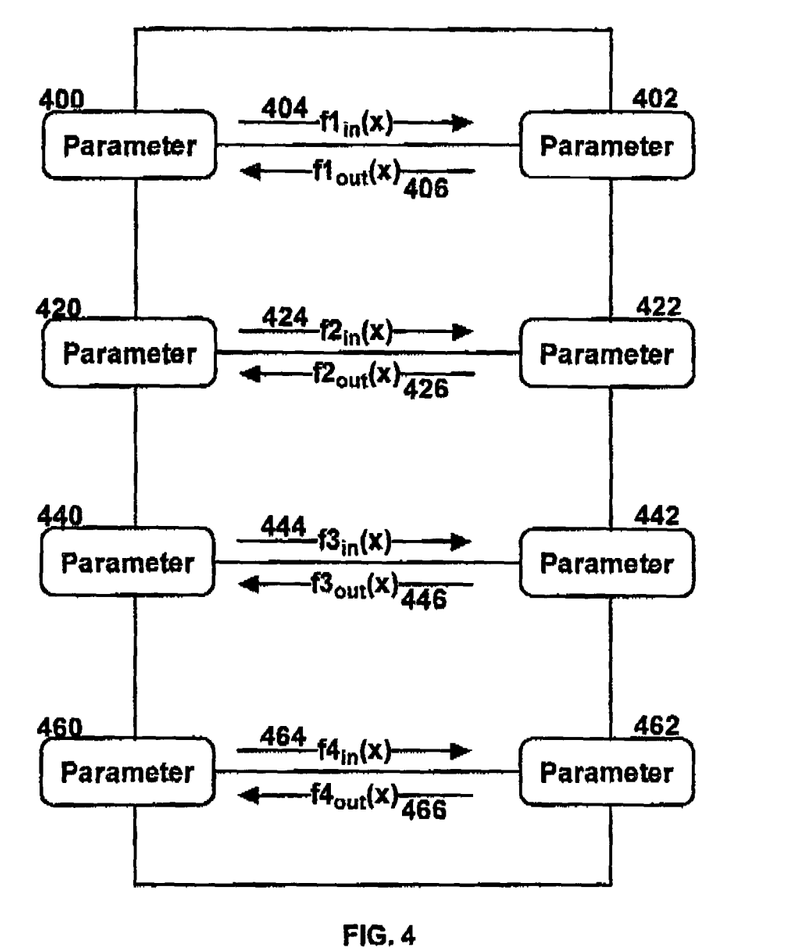
FIG. 4 illustrates that there may be different functions related to each bi-directional parameter mapping in a drill-through path.

FIG. 4 shows an embodiment in which several bi-directional drill-through mappings are illustrated, 400-402, 420-422, 440-442, 460-462, each having different mapping functions for each direction, 404 and 406, 424 and 426, 444 and 446, and 464 and 466.

All of the various functions and mappings are captured and modeled using a single drill-tough administration application. One preferred embodiment provides a single drill-through service that may be queried for drill-through information such as a list of targets from a given source or drill-through actions to be performed.

The various concepts that are used in the new drill-through mechanism of the present invention will be described below.

The invention solves several other problems found in earlier implementations. Since the drill-through source and targets are generalized as a collection of input and output parameters, it is no longer important to know in advance the actual drill-through target. This means, for example, the cubes built from data extracted from database "A" can still drill-through to a report whose data comes from database "B". It is the modeler's responsibility to ensure that the drill-through paths from the source and targets are properly matched up and the appropriate conversion functions are made available in the drill-through service.

Provision of the new drill-through mechanism of the present invention allows the drill-through model to be used in defining an Internet Uniform Resource Locator (URL) or a Hypertext Markup Language (HTML) FORM template, thereby providing for standard procedures in accessing data over the Internet. Therefore, in some preferred embodiments, a drill-through to any web-based target makes use of the generic ability to add parameters to a URL or FORM template. For example, in a case where a template is a string containing one or more predefined drill-through parameter placeholders, defined as <P1>, <P2>, ... etc., a drill-through target is defined as a URL;, using a well-known construction, for example:

http://myserver/path/app.cgi?params=(<P1 >,<P2>, <P3>)

Consider the case of a report that contains 3 columns named C1, C2, and C3. A drill-through path is defined that maps this source with the URL target. In this case the drill-through path is (C1->P1, C2->P2, C3->P3). Drilling from the source report at a specific row to the target means that the row values for C1, C2 and C3 will be substituted into the URL at the P1, P2, and P3 placeholders, thereby producing a valid URL, for example:

http://myserver/path/app.cgi?params=(C1, C2, C3)

A meta-data model is the model on which the reports are based. It is sometimes convenient to work with the underlying metadata, rather than the reports themselves. Therefore,. the concept of defining one or more drill-through paths between meta-data models will be described below. In the embodiments described above, a drill-through model designer is able to define a drill-through path from one report to another. The designer (user) may optionally define any parameters to be used in the context filter when navigating from one report to another. In addition, drill-through services embodying the invention support the definition of one or more drill-through paths between the different meta-data models. This has the advantage that reports based on the meta-data models can make implicit use of the already defined drill-through paths. The invention therefore affords a generalized way of assigning drill-through paths between reports without having to explicitly define drill-through paths between all reports. This is done by providing a list of potential drill-through paths between the query items of a model.

Various aspects of the use of the present invention are more fully explained by reference to the following examples.

Considering a situation where there are two different meta-data models. The first meta-data model is based on the "Sales" database and is used to allow the report writer to generate reports on all sales related information. The other meta-data model is based on the "Human Resources" database and allows report writers to generate reports of Personnel information. In some circumstances it is desirable to allow managers to drill-through from sales-based reports to personnel-based reports in order to answer questions such; "Is this individuals salary commensurate with his sales record?".

Figure 5:
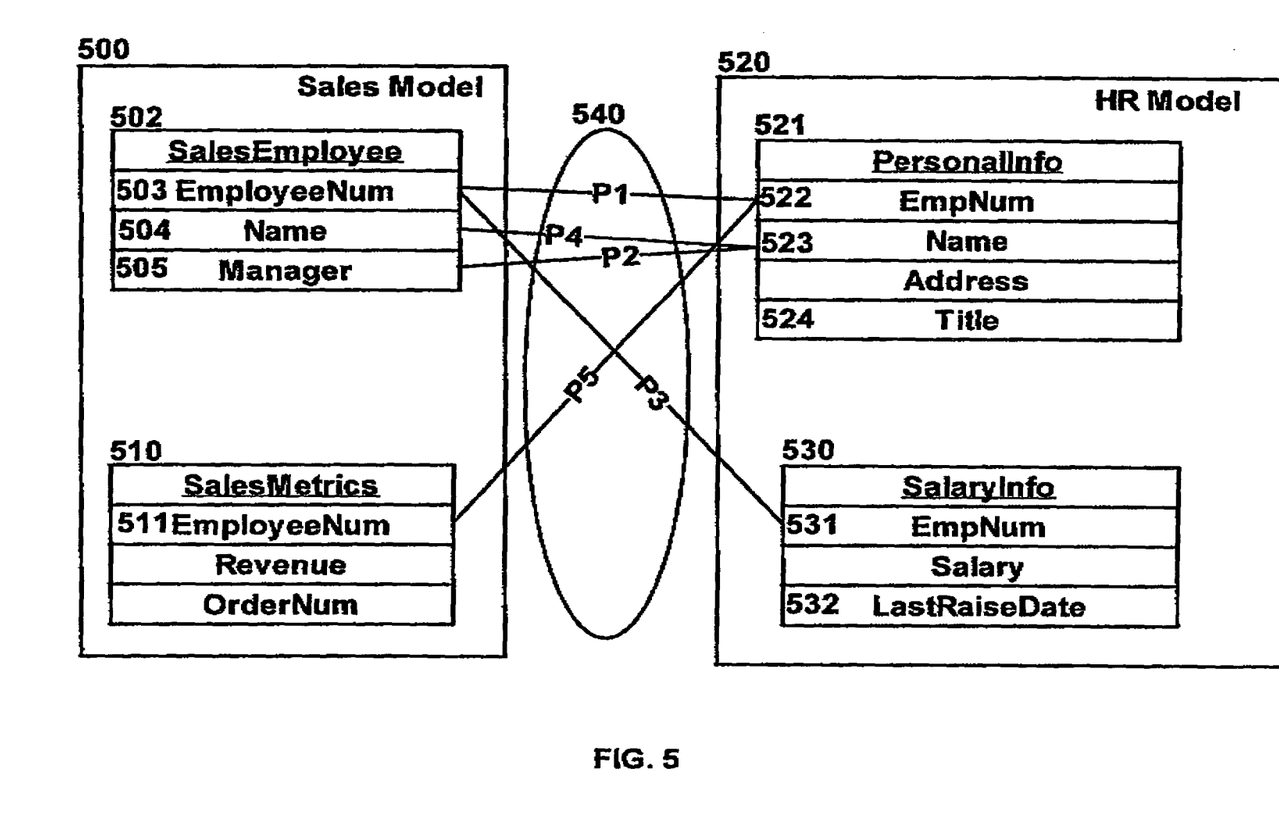
FIG. 5 shows the necessary parameter mappings and drill-through paths for a situation where two business models must be integrated.

We next describe in more detail how These kinds of queries are supported using embodiments of the present invention. In the FIG. 5, he two database models, Sales 500 and Human Resources 520 are shown, together with relationships (or drill-through paths) 540 represented by lines drawn between the related items representing their parameter mappings P1-P5. P1-P5 are determined and suitably defined by a trained modeler experienced in the use of such systems. The Sales model includes two separate tables, namely SalesEmployee 502 and SalesMetrics 510, and the Hun Resources Model includes a PersonalInfo table 521, and a SalaryInfo table 530. The relationships within 540 represent the parameter mapping from one model to the other as previous described with reference to FIGS. 3 and 4. In this case, the following parameter mappings are defined:

P1 between [SalesEmployee].[EmployeeNum] 503 and [PersonalInfo].[EmpNum] 522.
P2 between [SalesEmployee].[Manager] 505 and [PersonalInfo].[Name] 523.
P3 between [SalesEmployee].[EmployeeNum] 503 and [SalaryInfo].[EmpNum] 531.
P4 between [SalesEmployee].[Name] 504 and [PersonalInfo].[Name] 523.
P5 between (SalesMetrics.[EmployeeNum] 511 and [PersonalInfo].[EmpNum] 522.

Assume a source report is based on the Sales model (Sales) with the following columns;

[SalesEmployee].[Manager], [Sales Employee].[Name], total([SalesMetrics].[Revenue])

Further assume that the target report is to be based on the Human Resources model (HR info) with the following report columns;

[PersonalInfo].[Name], [PersonalInfo].[Title], [PersonalInfo].[Salary], [PersonalInfo].[LastRaiseDate]

Note that it is not necessary to have parameters assigned to all of the query items. In this example [PersonalInfo].[Title] 524, and [SalaryInfo].[LastRaiseDate] 532 are not assigned parameters.

For the sake of simplicity no parameter mapping functions are illustrated in this example. Their addition and effect when required will be obvious to one skilled in the art.

The report authoring tool first asks the drill-though service for a list of potential parameter mappings in drill-through path that could be used to drill-through from the source report (Sales) 500 to the target report (HR Info) 520. The drill-through service employs the following algorithm to determine the mappings:

1. Create a list of parameters (query items) from the source report 500 and target report 520.
2. For each source parameter determine a parameter mapping that maps the parameter to the target. All defined parameter mappings are collected as a single drill-through path
3. If more than one parameter mapping points to the same target parameter then duplicate the parameter mapping one for each duplicate target mapping. For example, in FIG. 5 there are potentially two parameter mappings pointing to the same target [PersonalInfo].[Name] 523. As a result, two separate parameter mappings are created from the sources [SalesEmployee].[Name] 504 and [SalesEmployee].[Manager] 505. These parameter mappings are P2 and P4 within the drill-thorough path 540. This duplication prevents any conflicts when the filter is formed.
4. Continue duplicating until all the parameter mappings for the drill-though path point to unique target parameters.

In this example, after completion of the above algorithm, the following parameter mappings from among those possible 540 will be returned from the drill-though service:

Parameter mapping #1 (P4) and
Parameter mapping #2 (P2).

Using these parameter mappings, it is possible to drill through from the sales report to the HR report and filter on either the salesperson's name or on the manager's name. The parameterised drill-through service of the present invention therefore allows the user to obtain the answer to either or both of the two questions:

1. "How much am I paying a sales person relative to their generated revenue?" and
2. "How much am I paying a manager relative to the total revenue of the sales people being managed?"

Only a single parameter mapping for each drill-through path is used here since only one parameter is matched from source to target, Generally, a drill-through path may contain any number of applicable parameter mappings.

Since it cannot be known in advance what pats of the report a model may use, a drill-through path is fully defined during the modeling phase. Therefore a collection of parameter mappings (P1-P5) 540 is provided from which the actual drill-through path can be built dynamically depending on what columns parameters) are available in The source and target reports.

It is possible to have more than one parameter mapping generated, as shown here, so that a drill-through path selection must be made by the user.

Figure 6:
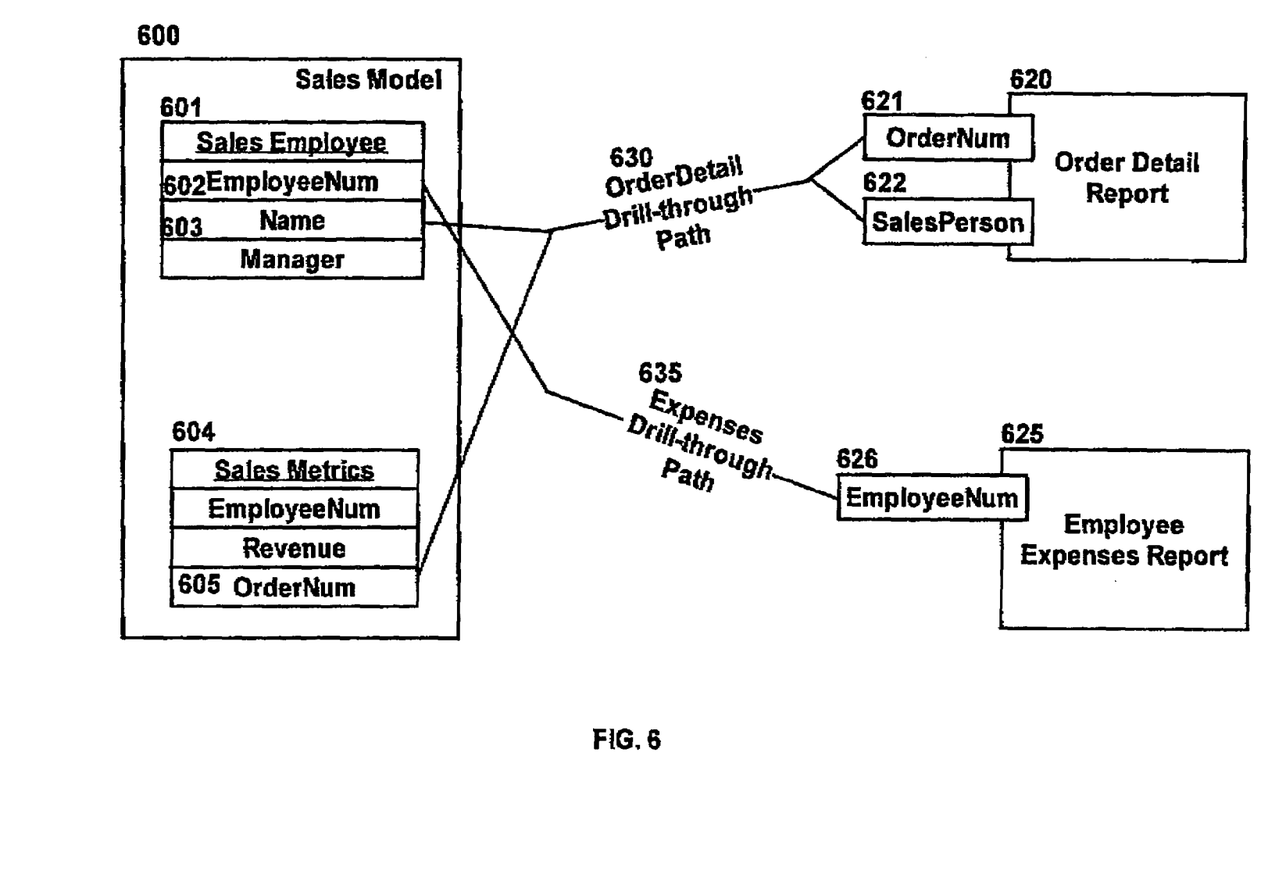
FIG. 6 is a more complex example, relating three business models.

Expanding on this general model of drill-through usage, it is also possible to define general drill-through paths from a meta-data model to specific reports. FIG. 6 shows a Sales model 600 having two drill-through paths 630, 635 defined to two separate reports: an Order Detail Report 620 and an Employee Expenses Report 625.

One of the parameter mappings of the "OrderDetail" drill-through path 630 maps [SalesMetrics].[OrderNum] 605 to report column "Order Number" 621. The "Expenses" drill-through path 635 contains a single parameter mapping on [SalesEmployee].[EmployeeNum] 602 to report column "Employee Number" 626. In some cases other parameters are available to be used in other instances of using the drill-through service. In some cases it is up to the drill-through target report to dispense with unnecessary filtering as part of any optimisation.

Once these drill-through services indicated by the paths 630, 635 have been defined, then any report that included either or both of the Sales Model 600 items [SalesMode].[SalesEmployee].[Name] 603 and [SalesModel].[SalesMetrics].[OrderNumber] 605 can drill-through to the OrderDetail report 620. Similarly any report that includes a report column based on [SalesEmployee].[EmployeeNum] 602 can drill-through to the Employee Expenses report 625.

This next example describes the drill-through parameter mapping to and from OLAP sources to models for relational report tools.

Figure 7:
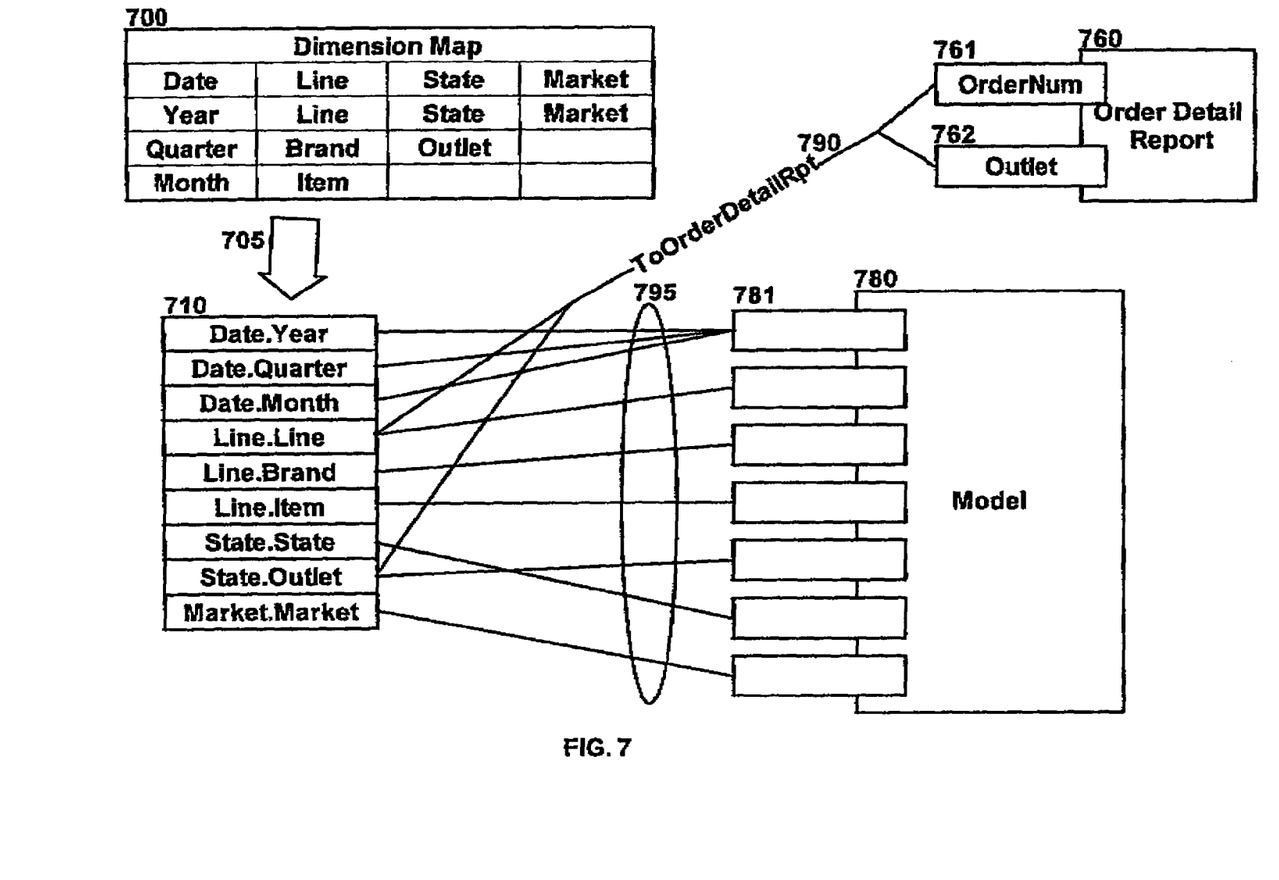
FIG. 7 is a further example, also showing the relationship with a Dimension Maps.

Referring to the FIG. 7, a cube 710 (represented in this diagram as being derived from a dimension map 700 by a suitable transformation tool 705) has a set of parameters which are the dimension levels. Each level is represented by (or exposed as) a parameter.

In one case a drill-through path 790 is defined from the cube 710 to the report OrderDetail Report 760, the path having two parameters mappings (OrderNum) 761, (Outlet) 762.

In another case, the cube parameters 710 are mapped to a model. This is a generalized case which is similar to the model to model case previously described. Drill-through paths 795 and their related parameter mappings 781 are defined between the cube 710 and the Model 780. As a consequence, any reports that are based on the model can drill through into the cube assuming that the required parameters (columns) are included in the report.

It has been found that significant savings are realised in terms of the number and the updating of drill-through paths, when compared to the situation before the availability of parameterised drill-through paths and their associated parameter mappings.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the attached or associated claims and their equivalents.

The invention can be implemented in digital electronic circuitry or in computer hardware, firmware, and software or in combinations thereof. Apparatus of the present invention can be implemented in a computer program product tangibly embodied in a machine-readable storage device for execution by a programmable processor. The method of the present invention can be performed by a programmable processor executing a program of instructions to perform the functions of the invention by operating on input data and generating output.

What is claimed is:

1. A method comprising:
   generating, by a computer system, a drill-through path between a first meta-model on which a first drill-through source is based and a second meta-model on which a drill-through target is based to service a first request for first data, wherein the drill-through path comprises a parameter mapping between a first source parameter associated with the first drill-through source and at least one target parameter associated with the drill-through target;
   in response to receiving a second request for second data, the second request being based at least in part on a second source parameter associated with a second drill-through source:
      determining, by the computer system, that the drill-through path that was already defined between the first meta-model and the second meta-model and that was generated by the computer system in response to servicing the first request for first data is usable to service the second request for the second data; and
      performing, based on determining that the drill-through path that was already defined is usable to service the second request, a drill-through operation to convert data from the drill-through target to converted data for the second drill-through source, wherein the drill-through operation is provided by a drill-through service associated with the drill-through path.

2. The method of claim 1, further comprising:
   determining, by the computer system, a plurality of potential drill-through mappings between the drill-through target and the first drill-through source;

generating, by the computer system, a plurality of source parameters associated with the first drill-through source and a plurality of target parameters associated with the drill-through target; and associating, by the computer system, the first source parameter with the first drill-through source and the at least one target parameter with the drill-through target to generate the parameter mapping.

3. The method of claim 2, further comprising:

in response to determining that at least two of the plurality of source parameters associated with the first drill-through source map to the target parameter of the plurality of target parameters, generating, by the computer system, first and second parameter mappings, wherein the first parameter mapping comprises a first association between the target parameter of the plurality of target parameters and a first source parameter of the at least two of the plurality of source parameters, and wherein the second parameter mapping comprises a second association between the target parameter of the plurality of output parameters and a second source parameter of the at least two of the plurality of input parameters.

4. The method of claim 1, wherein the computer system is a first computer system, the method further comprising:

generating, by the first computer system, at least one of a Uniform Resource Locator or a markup language template that specifies the second source parameter, wherein receiving the second request for data further comprises receiving, by the first computer system, the second request from a second computer system using the at least one of a Uniform Resource Locator or a markup language template; and sending, by the first computer system, the converted data to the second computer system.

5. The method of claim 1, further comprising:

providing, by the computer system, the drill-through service in association with the drill-through path to process requests for data included in at least one of the drill-through target, the first drill-through source, and the second drill-through source; and receiving, by the computer system, the second request that is based at least in part on the second source parameter associated with the drill-through source to perform a drill-through operation that selects data from the drill-through target, wherein the drill-through operation is provided by the drill-through service.

6. The method of claim 1, further comprising, outputting for display, by the computer system, the converted data.

7. A computer system comprising:

at least one processor configured to:

generate a drill-through path between a first meta-model on which a first drill-through source is based and a second meta-model on which a drill-through target is based to service a first request for first data, wherein the drill-through path comprises a parameter mapping between a first source parameter associated with the first drill-through source and at least one target parameter associated with the drill-through target;

in response to receiving a second request for second data and the second request being based at least in part on a second source parameter associated with a second drill-through source:

determine that the drill-through path that was already defined between the first meta-model and the second meta-model and that was generated by the at least one processor in response to servicing the first request for first data is usable to service the second request for the second data; and perform, based on determining that the drill-through path that was already defined is usable to service the second request, a drill-through operation to convert data from the drill-through target to converted data for the second drill-through source, wherein the drill-through operation is provided by a drill-through service associated with the drill-through path.

8. The computer system of claim 7, wherein the at least one processor is further configured to:

determine a plurality of potential drill-through mappings between the drill-through target and the first drill-through source;

generate a plurality of source parameters associated with the first drill-through source and a plurality of target parameters associated with the drill-through target; and associate the first source parameter with the first drill-through source and the at least one target parameter with the drill-through target to generate the parameter mapping.

9. The computer system of claim 8, wherein the at least one processor is further configured to:

generate, in response to determining that at least two of the plurality of source parameters associated with the first drill-through source map to the target parameter of the plurality of target parameters, first and second parameter mappings, wherein the first parameter mapping comprises a first association between the target parameter of the plurality of target parameters and a first source parameter of the at least two of the plurality of source parameters, and wherein the second parameter mapping comprises a second association between the target parameter of the plurality of output parameters and a second source parameter of the at least two of the plurality of input parameters.

10. The computer system of claim 7, wherein the computer system is a first computer system and wherein the at least one processor is further configured to:

generate at least one of a Uniform Resource Locator or a markup language template that specifies the second source parameter;

receive the second request from a second computer system using the at least one of a Uniform Resource Locator or a markup language template; and send the converted data to the second computer system.

11. The computer system of claim 7, wherein the at least one processor is further configured to:

provide the drill-through service in association with the drill-through path to process requests for data included in at least one of the drill-through target, the first drill-through source, and the second drill-through source; and receive the second request that is based at least in part on the second source parameter associated with the drill-through source to perform a drill-through operation that selects data from the drill-through target, wherein the drill-through operation is provided by the drill-through service.

12. The computer system of claim 7, wherein the at least one processor is further configured to output for display the converted data.

13. A computer program product for servicing requests using a drill-through path, the computer program product comprising a non-transitory machine readable storage device having computer-readable program code embodied therein, the computer-readable program code comprising:
  computer-readable program code to generate a drill-through path between a first meta-model on which a first drill-through source is based and a second meta-model on which a drill-through target is based to service a first request for first data, wherein the drill-through path comprises a parameter mapping between a first source parameter associated with the first drill-through source and at least one target parameter associated with the drill-through target;
  computer-readable program code to, in response to receiving a second request for second data, the second request being based at least in part on a second source parameter associated with a second drill-through source:
    determine that the drill-through path that was already defined between the first meta-model and the second meta-model and that was generated by a computing device in response to servicing the first request for first data is usable to service the second request for the second data; and
    perform, based on determining that the drill-through path that was already defined is usable to service the second request, a drill-through operation to convert data from the drill-through target to converted data for the second drill-through source, wherein the drill-through operation is provided by a drill-through service associated with the drill-through path.

14. The computer program product of claim 13 for servicing requests using the drill-through path, the computer program product comprising the non-transitory machine readable storage device having computer-readable program code embodied therein, the computer-readable program code further comprising:
  computer-readable program code to determine a plurality of potential drill-through mappings between the drill-through target and the first drill-through source;
  computer-readable program code to generate a plurality of source parameters associated with the first drill-through source and a plurality of target parameters associated with the drill- through target; and
  computer-readable program code to associate the first source parameter with the first drill-through source and the at least one target parameter with the drill-through target to generate the parameter mapping.

15. The computer program product of claim 13 for servicing requests using the drill-through path, the computer program product comprising the non-transitory machine readable storage device having computer-readable program code embodied therein, the computer-readable program code further comprising:
  computer-readable program code to generate, by a first computer system, at least one of a Uniform Resource Locator or a markup language template that specifies the second source parameter;
  computer-readable program code to receive the second request from a second computer system using the at least one of a Uniform Resource Locator or a markup language template; and
  computer-readable program code to send, by the first computer system, the converted data to the second computer system.

16. The computer program product of claim 13 for servicing requests using the drill-through path, the computer program product comprising the non-transitory machine readable storage device having computer-readable program code embodied therein, the computer-readable program code further comprising:
  computer-readable program code to provide the drill-through service in association with the drill-through path to process requests for data included in at least one of the drill-through target, the first drill-through source, and the second drill-through source; and
  computer-readable program code to receive the second request that is based at least in part on the second source parameter associated with the drill-through source to perform a drill- through operation that selects data from the drill-through target, wherein the drill-through operation is provided by the drill-through service.

17. The computer program product of claim 13 for servicing requests using the drill-through path, the computer program product comprising the non-transitory machine readable storage device having computer-readable program code embodied therein, the computer-readable program code further comprising:
  computer-readable program code to generate the converted data for display.

* * * * *